July 7, 1953 E. A. ERICSSON ET AL 2,644,932

PULSE AMPLITUDE RESPONSIVE SELECTIVE SYSTEM

Filed Dec. 7, 1948 2 Sheets-Sheet 1

INVENTORS
ERIC ARVID ERICSSON
ERIK WALDEMAR HULLEGÅRD
ANTON CHRISTIAN JACOBAEUS
BY Leech and Radue
ATTORNEYS

PULSE AMPLITUDE RESPONSIVE SELECTIVE SYSTEM

Filed Dec. 7, 1948 2 Sheets-Sheet 2

INVENTORS
ERIC ARVID ERICSSON
ERIK WALDEMAR HULLEGÅRD
ANTON CHRISTIAN JACOBAEUS
BY Leach and Radue
ATTORNEYS Patented July 7, 1953 2,644,932

UNITED STATES PATENT OFFICE 2,644,932

PULSE AMPLITUDE RESPONSIVE SELECTIVE SYSTEM

Eric Arvid Ericsson, Erik Waldemar Hullegård, and Anton Christian Jacobaeus, Stockholm, Sweden, assignors to Telefonaktiebolaget L M Ericsson, Stockholm, Sweden, a company of Sweden Application December 7, 1948, Serial No. 63,872
In Sweden December 11, 1947

4 Claims. (Cl. 340—172)

In order to enable a telephone subscriber to transmit the number of the subscriber, to whom he wishes to speak, to the automatic telephone exchange to which he is connected, it must be possible to send over the subscriber's line signals indicating the figures of said number. This has hitherto taken place by means of series of short interruptions—following each other quickly—in a circuit from a central battery at the telephone exchange, which circuit passes in a loop over the two wires of the subscriber's line and comprises an impulse relay at the exchange. The interruptions have been produced by means of a dial.

Attempts have been made to transmit necessary signals by means of change in a resistance in a circuit over the subscriber's line. To this purpose, all the subscriber's lines have, before the emission of the signal, been compensated to a definite resistance value and been connected in a balance- or bridge-connection, the influence of variations in the voltage of the exchange battery thus being eliminated. By means of push-buttons at the subscriber's apparatus, different resistances have been introduced in the line circuit and been measured at the exchange by automatic setting of the resistance so that the balance has been maintained. The size of the necessary change indicates the value of the signal.

The fact that similar systems have not yet been used within automatic telephony is mostly due thereto, that it has not yet been possible to compensate ten different settings with sufficient precision and speed. Rotary selectors move much too slowly, and relay chains with ten combinations cannot either follow the quick signal emission from a key set.

Nowadays a sufficient precision can be obtained at compensation of line resistances by means of sensitive relays, and values.

The object of the present invention is to produce a sufficiently quick registration of signals consisting of changes in the resistance on a subscriber's line and produced by the keys in a keyset. This is obtained, when the line circuit is closed over an adjustable resistance and is a part of a bridge-connection comprising a receiving relay at the exchange, by said receiving relay having a neutral intermediate position and two side-positions, in which the relay actuates contacts closing circuits for the setting of an adjustable balance-resistance in said bridge-connection and automatically set by means of special contact devices, so that the balancing of the resistance of the line circuit is obtained after each change in the resistance corresponding to a signal, whereby the size of the change indicates the signal.

Due to the receiving relay having one intermediate position and two working positions, fixed processes are obtained as well at the beginning as at the end of each signal; the value of the signal can simultaneously be read on the compensating resistance necessary to restore the receiving relay to its neutral position.

Figure 1:
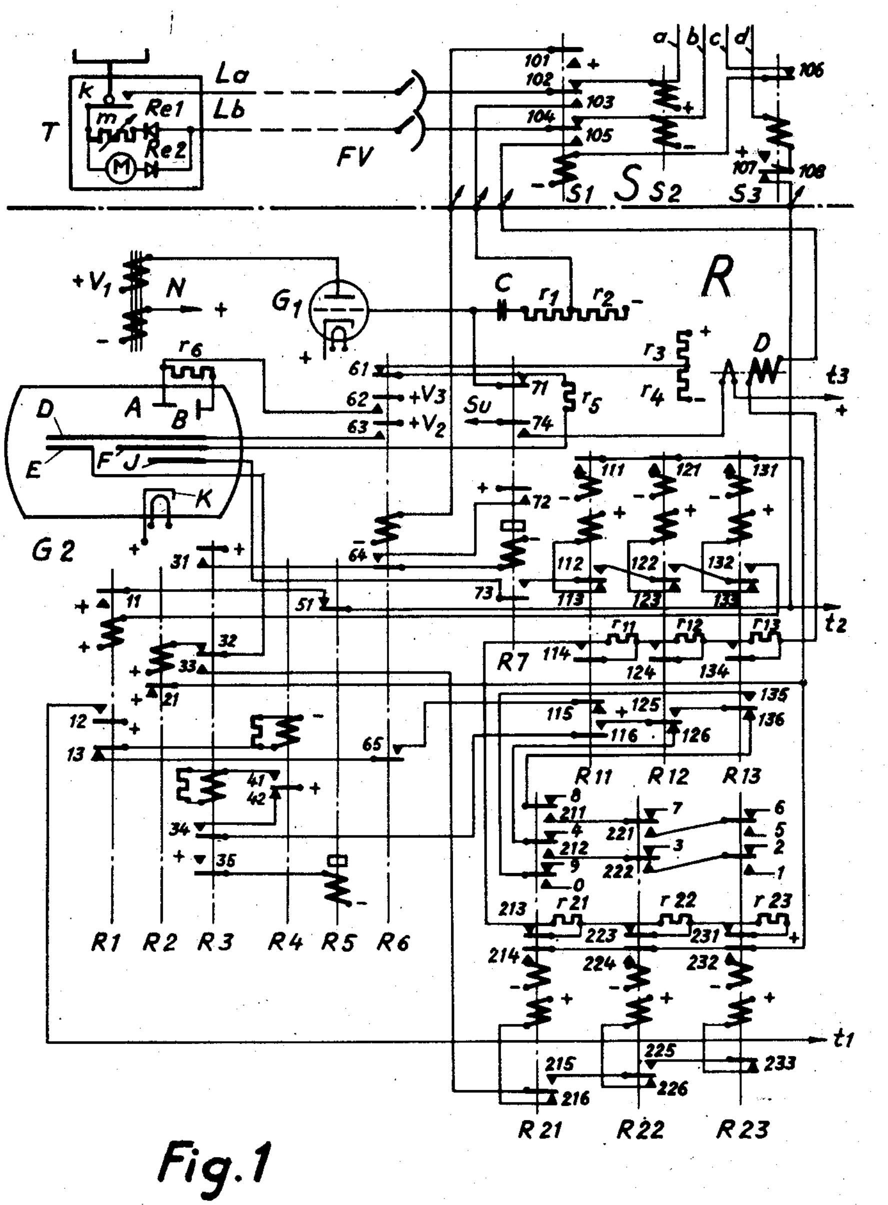
Figure 2:
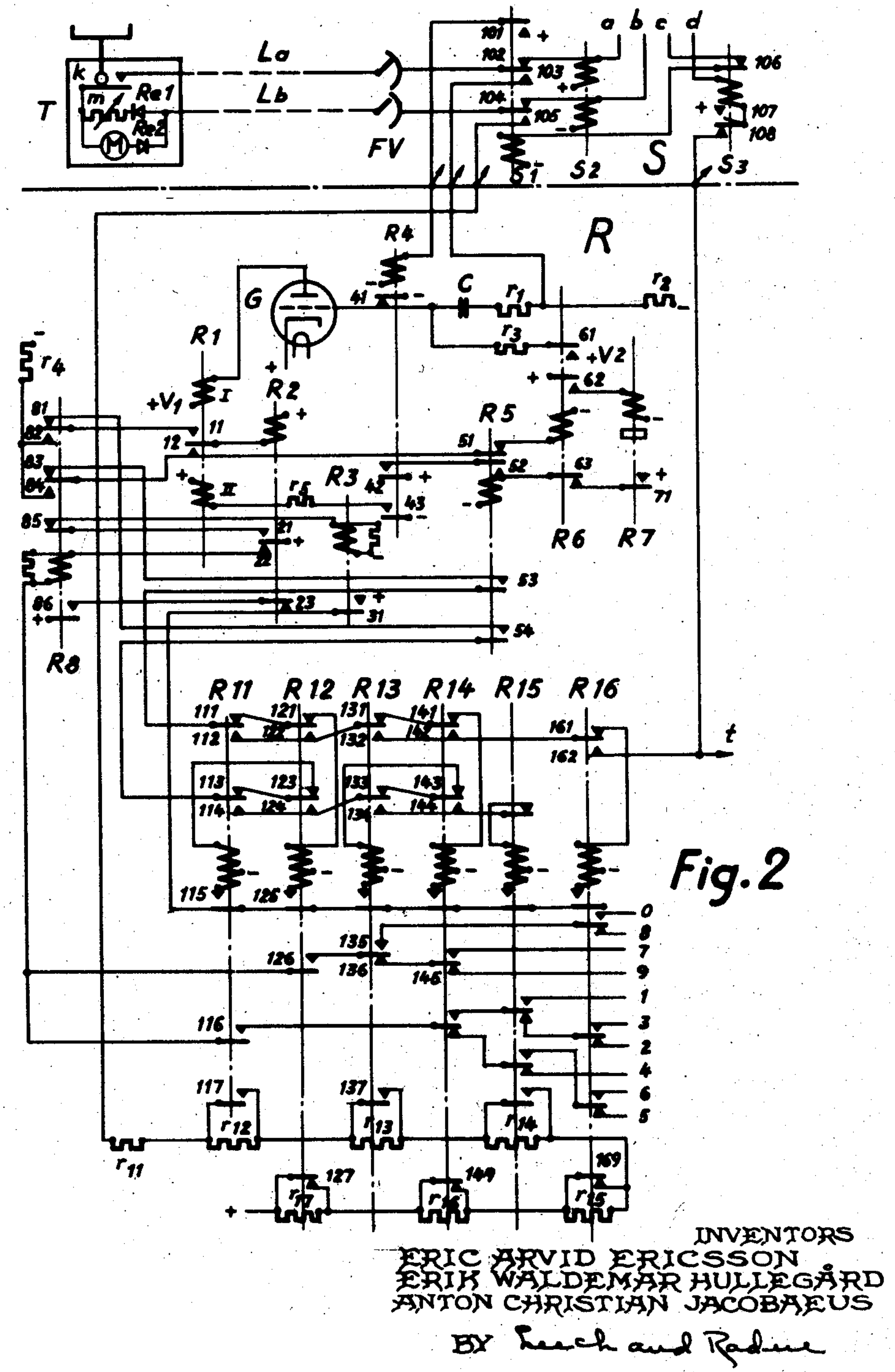

The invention will be described more closely with reference to the accompanying drawings Figs. 1–2 showing different embodiments of the invention.

In Fig. 1 an embodiment of the invention is shown, which is intended for subscriber's lines. Since only relatively small variations of the resistance of the line circuit arise at signal emission by means of changes in the resistance on long subscriber's lines, a great sensitivity of the receiving devices is needed. This is obtained by means of aspecial discharge tube G2, comprising on one hand two electrodes, an anode A and a cathode K, between which a discharge can be produced by connecting them to different poles of a source V3 of potential, and arranged so within the discharge tube, that an arc discharge shaped as a string, outside which only an unimportant ionization of the gas is obtained, can be kept up between them when they are connected to the source of potential, and on the other hand at least two further electrodes E and J, to which the arc can be directed by increasing or respectively decreasing a magnetic field, over which further electrodes circuits for setting of an adjustable balance resistance, r11—r13, and r21—r23 at the telephone exchange, are closed.

It is especially important that the balancing of the resistance of the subscriber's line be adjusted with great carefulness. This is attained by successive increase of the grid tension on an electron tube G1 by charging a condenser connected to one of the grids of the electron tube until the anode current of the electron tube makes the arc discharge in the above mentioned discharge tube take a neutral position betwen the two further electrodes E and J. To this purpose there are two helping electrodes F and D, over which a circuit for charging the condenser C is closed, when the arc discharge ionizes the gas on one of the spots between them. How this takes place will appear from the following description.

At call from the telephone instrument T, contact *k* is closed and a circuit over the subscriber's line is closed. In a known way, which is not shown in the figure, the subscriber's line La—Lb is thereafter connected over a selector FV to a connecting link S, which is by means of a connecting relay S1 connected to a register with a receiving device R. The relays S1—S3 and the talking wires *a*—*b* as well as two control-wires *c* and *d* are all that is shown of the connecting link. When the contacts 101—105 are actuated, a circuit is closed for relay R6 in the register by contact 101. Relay R6 attracts its armature and contacts 61—65 are actuated. The following circuit is simultaneously closed: + battery, contact 231, 223 and 213, resistances *r*11—*r*13, winding on choke-coil D, contact 105, selector FV, line wire L*b*, rectifier Re1, resistance *m*, contact *k*, line wire L*a*, selector FV, contact 103, resistance *r*2 to negative battery. The resistance *m* can be varied by means of a keyset in the telephone instrument T. A voltage drop, which varies with the resistance of the subscriber's line, is obtained over resistance *r*2. When contact 62 is closed, the voltage +V3 is connected to the discharge tube G2, and an arc discharge takes place first between the ignition electrode B and the cathode K, which is indirectly heated, and thereafter, due to the voltage drop over resistance *r*6, between the anode A and the cathode K. The discharge tube G2 lies in a magnetic field generated by an electromagnet N. The condenser C is from the beginning charged with a certain tension, which is determined by the resistances *r*3 and *r*4 and is fed to the condenser over contacts 61 and 71. When contacts 61—65 have been actuated and the arc discharge in tube G2 is lighted the electron tube G1 has such a strong negative grid tension, that the anode current from the source of potential +V1 does not noteworthily effect the magnetic field from the magnet N. The arc discharge in tube G2 thereby takes place on the right side of the figure and a conducting connection is obtained between the electrodes D and F. The condenser C is thereby charged in the following circuit: The source of potential +V2, the electrodes D and F, resistance *r*5, contact 71, condenser C, resistances *r*1 and *r*2, to negative. As the condenser C is charged, the voltage increases on the grid in tube G1, and the anode current increases likewise and increases the field strength from magnet N so that an arc discharge in the discharge tube G2 is removed to the left on the figure. When the arc discharge has been removed so far, that it does not ionize the gas any longer between the electrodes D and F, the charging of the condenser C ceases. If thereby the grid tension in tube G1 is still negative, the charging of the condenser and its tension will not change during the following connecting process.

When contact 65 is closed, the following circuit is closed: +battery, contacts 115, 65 and 13, winding on relay R4, to negative battery. Relay R4 attracts its armature. Contacts 41—42 are actuated. Relay R3 attracts its armature. Contacts 31—35 are operated. Relays R5 and R7 attract their armatures. Contacts 51 and 71—74 are operated. When contact 71 breaks, the charging of the condenser C must be completed.

The electrode F is thereafter disconnected by contacts 71 and 61, and the electrode J connected by contact 73. The arc discharge is on the left side of the electrode F and touches either the electrode E or the electrode J. Relay R7 is self-bound over contact 72 in dependence of contact 64. A buzzer tone is connected from the buzzer generator S*u* over contact 74, winding on the choke coil D to +battery over wire *t*3. This circuit is broken in the register by the member which registers the first figure.

When the subscriber hears the buzzer tone, the dialling can begin. Thereby a further resistance is connected in series with the line wires L*a*—L*b*, whereby the voltage over resistance *r*2 decreases. The anode current in tube G1 decreases and therewith the field strength through magnet N. The arc discharge thereby moves to the right in the figure and an electric connection is obtained between the electrodes D and J. The following circuit is closed: +V2, the electrodes D and J, contacts 73 and 113, winding on relay R11 to positive. Relay R11 attracts its armature and is self-bound over contacts 21 and 111. Contact 114 short-circuits resistance *r*11, whereby the current strength on the subscriber's line and the voltage over resistance *r*2 increases. If the increase of resistance in the adjustable resistance *m* is thereby compensated, the arc discharge in the tube G2 moves again to its neutral position, and the current between the electrodes D and J is broken. If the short-circuiting of the resistance *r*11 implies too little a decrease of the resistance, the arc discharge in the tube G2 will not break the electrical connection between the electrodes D and J, but the following circuit will be closed: +V2, the electrodes D and J, contacts 73, 112 and 123, winding on relay R12 to +battery. Relay R12 attracts its armature and contacts 121—126 are actuated, whereby resistance *r*12 is also short-circuited. If this is not either sufficient, relay R13 is operated, whereby resistance *r*13 is also short-circuited. Should, on the other hand, an over-compensation follow the short-circuiting of one of the resistances *r*11—*r*13, e. g. when *r*11 is short-circuited, the arc discharge in the tube G2 will move past the neutral position, whereby an electrical connection is obtained between the electrodes D and E instead of between the electrodes D and J. The following circuit is closed: +V2, the electrodes D and E, contacts 33 and 216, winding on relay R21 to positive. Relay R21 attracts its armature. The contacts 8, 4, 9, 0 and 211—216 are actuated. Contact 213 connects the resistance *r*21 in series with the subscriber's line, whereby the arc discharge in tube G2 moves to the right. If the move is not sufficient for the neutral position to be reached, relay R22 also attracts its armature, whereby contacts 7, 3 and 221—226 are actuated and resistance *r*22 connected. Relay R23 may possibly also be operated and contacts 6, 5, 2, 1 and 231—233 actuated and resistance *r*23 connected. If we suppose that the Figure 2 has been dialled by the subscriber, the arc discharge in tube R2 reaches its neutral position, when resistance *r*22 is connected by relay R22.

When relay R11 actuates contact 115, the current for relay R4 is broken, said relay then releases its armature with some delay due to a resistance being connected in parallel with the winding of the relay. In the same way relay R3 is somewhat slow-releasing. During the release-time of relay R4, the setting of the relays R11—R13 and R21—23 must take place. During the release-time of relay R3 the following circuit is closed for the registering of the figure: + battery, contacts 42, 34, 116, 126, 212, 222 and 2, if, as supposed above, the figure 2 has been dialled. From contact 2 there is a connection to the registering part of the register. When relay R3 releases its armature, the registering process must be over. Thereafter, no change takes place until the subscriber lets the pushed down button go. Should the slow-releasing relay R5 release its armature, this entails no change, since the arc discharge in tube G2 is at its neutral position. When the subscriber lets the pushbutton go, the balance is disturbed and the arc discharge moves to the left, whereby the following circuit is closed: +V2, the electrodes D and E, contact 32, winding on relay R2 to positive. Relay R2 attracts its armature. Contact 21 is actuated, and the excitation circuits for the relays R11—R13 and R21—R23 are broken. Those of relays R11—R13 and R21—R23, which have been actuated, release their armatures, whereafter the balance is restored again and the arc discharge in tube G2 remains in its neutral position. Contact 115 is closed again. Relays R4, R3 and R5 are operated and relay R2 releases its armature.

Should the subscriber put down his micro-telephone, the circuit over the subscriber's line is then broken, the arc discharge in tube G2 remains on the right side even after the three relays R11—R13 having attracted their armatures. Relay R1 receives current over contacts 112, 122 and 132. Relays R3—R5 release their armatures. Relay R1 attracts its armature, contacts 11—13 are operated and the following circuit is closed: + battery, contacts 11, 51, 108, winding on relay S3, to negative over wire *d* in the connecting link S. Relay S3 attracts its armature, contacts 106—108 are actuated. The circuit for relay S1 is broken. Relay S1 releases its armature and the connecting link S is short-circuited from the receiving device R.

If the connecting process is pursued, the register will connect positive to wire *t*2 and short-circuit the connecting link S. The current-feeding relay S2 will thereby be connected to the subscriber's line, whereby the following circuit is closed: + battery, winding on the current-feeding relay S2, contact 102, selector FV, line wire L*a*, contact *k*, microphone M, rectifier R*e*2, line wire L*b*, selector FV, contact 104, winding on the current-feeding relay S2 to negative.

If all the subscriber's instruments are not provided with keysets, but some of the instruments with dials are connected to the telephone exchange, the receiving device R must also be made so as to be able to receive impulse series. The process which takes place when a subscriber replaces his micro-telephone begins for each impulse, but the relay R5, which is slow-releasing, has not time to release its armature, since contact 51 is not closed and the connecting link S therefore not disconnected. Relay R1 attracts and releases its armature once for each interruption, i. e. each impulse from the dial. The impulses are repeated by contact R1 over wire *t*1 to a registering device. After each impulse, relay R2 is actuated and the relays R11—R13 are released.

In Fig. 2, a telephone instrument T and a connecting link are shown according to Fig. 1, these parts of Fig. 2 therefore not needing be described more closely. Similarly, relays R11—R16 are the same as in Fig. 2. When the register R is busied, relay R4 attracts and contacts 41—43 are actuated. The condenser C is thereby discharged and the grid to the electron tube G has a strong negative bias. The polarized relay R1 receives current over contact 43 and resistance *r*5 through its winding II and is actuated so that contact 12 is closed, whereby relay R6 receives current and attracts its armature. Contacts 61—63 are actuated. Relay R7 and contact 71 are operated. Thereafter the condenser C is charged in series with the resistances *r*3 and *r*2. There is already a certain voltage over resistance *r*2, which voltage depends on the resistance of the subscriber's line, due to the following circuit: +, contacts 127, 149 and 169, resistances *r*14, *r*13, *r*12 and *r*11, contact 105, selector FV, line wire L*b*, rectifier R*e*1, resistance *m*, contact *k*, line wire L*a*, selector FV, contact 103, resistance *r*2 to negative. As the condenser C is charged, the anode current from the anode battery +V1 increases in the winding I on relay R1. When the current is winding I balances the current in winding II, relay R1 is moved to its neutral position. Contact 12 breaks the current for relay R6, which releases its armature, whereby the charging of condenser C is broken. During the release time of relay R7, relay R5 receives current over contacts 71 and 63 and is self-bound over contacts 42 and 52. Contacts 51—54 are actuated.

At change in the resistance *m* from the telephone instrument T, the current through winding I on relay R1 increases or decreases, whereby one of the contacts 11 and 12 are closed. Those of the relays R11—R16 are thereby operated, which are necessary for the compensation of the change in the resistance *m*. Relay R2 simultaneously attracts its armature. Contacts 21—23 are actuated. Relay R3 receives current over contacts 21 and 85 and closes contact 31. After compensation, relay R1 is lastly removed to its neutral position and relay R2 releases its armature. The setting of relays R11—R16 is registered in a special registering device which is not shown, through a circuit from contact 22 through relay R8, over contacts 116 or 126 to one of the wires 0—9. Relay R8 attracts its armature during the release-time for relay R3. Contacts 81—86 are actuated. When the signal is over, relay R1 is actuated again and one of the contacts 11 and 12 are closed. Relay R2 thereby receives current through resistance *r*4 over one of the contacts 82 and 84. Contact 23 is operated and the holding of the relays R11—R16, which was before done by contact 31 or the contacts 86 and 23, is broken. Relays R11—R16 are released and the balance is restored. Relay R1 is removed to its neutral position and relays R2 and R8 release their armatures, whereafter a new signal can be received.

We claim:

1. In an automatic telephone system, for use with a subscriber's line having a variable resistance connected between the branches of said line at one end of the line, of a selector signal receiving device, means connecting the other end of said subscriber's line to said receiving device, in said receiving device an indicating relay influenced by an energized electric circuit including said line and said variable resistance, an electronic valve, a condenser connected to the grid of said valve, a winding on said relay energized by the anode current of said valve, energized circuit means actuated under control of said indicating relay when said line is connected to said receiving device and changing the charge of said condenser, relays and contacts releasing and disconnecting said energized circuit means when the anode current through said winding brings said indicating relay to either its operating or releasing condition, means to vary said variable resistance to send a signal over said subscriber's line to said receiving device, a variable impedance in the electric circuit in said receiver, operating means when actuated varying said impedance, said indicating relay being connected for operation by said variation to actuate said operating means, said operating means being arranged to restore said relay to its initial condition through a variation of said impedance, and means causing the position of said operating means to represent said signal.

2. Device according to claim 1, wherein the indicating relay is a polarized relay with an intermediate position and two side positions, two windings on said relay counteracting each other, means delivering the anode current of said electron tube to one winding, means delivering a current to the other winding which is determined by the voltage of the battery at the telephone exchange and a fixed resistance.

3. For use in an automatic telephone system, having a subscriber's line, a first variable resistance connected between the branches of and at one end of the line and adapted to be increased or decreased, and means to connect the other end of said subscriber's line to a receiving device; said receiving device comprising in combination a second variable resistance, a fixed resistance and an indicating relay influenced by a first electric circuit including said second variable resistance, said line with said first variable resistance and said fixed resistance; an electronic valve having a plate, grid and cathode, a condenser connecting the voltage over said fixed resistance to the grid of said valve; a first winding on said relay energized by the anode current of said valve; a second winding on said relay energized in a circuit closed when said line is connected to said receiving device; a set of relays connected to vary said second variable resistance; circuit means under control of said indicating relay for changing the polarity of charge of said condenser; auxiliary relays for disconnecting said circuit means when the valve anode current through said first winding brings said indicating relay to either its operating or releasing condition and connecting said set of relays under control of said indicating relay; a signal over said subscriber's line to said receiving device produced by varying said first resistance causing said indicating relay to actuate selected ones of said set of relays to vary said second variable resistance to compensate the variation of said first variable resistance and means on said relays of said set to indicate the signal.

4. In an automatic telephone system according to claim 3, said indicating relay being a polarized relay the armature of which has a rest position and two side positions; said set of relays containing two relay chains one being operated by said indicating relay in one of its side positions to increase said second variable resistance and the other being operated by said indicating relay in the other of its side positions to decrease said second variable resistance.

ERIC ARVID ERICSSON.
ERIK WALDEMAR HULLEGÅRD.
ANTON CHRISTIAN JACOBAEUS.

References Cited in the file of this patent

UNITED STATES PATENTS

| Number | Name | Date |
|---|---|---|
| Re. 22,794 | Deakin | Oct. 1, 1946 |
| 1,242,009 | Lundell | Oct. 2, 1917 |
| 1,459,359 | Powell | June 26, 1923 |
| 1,736,283 | Gardner | Nov. 19, 1929 |
| 1,800,019 | Hewett | Apr. 7, 1931 |
| 1,952,368 | Gardner | Mar. 27, 1934 |
| 1,982,290 | Gardner | Nov. 27, 1934 |
| 2,360,751 | Ziebolz | Oct. 17, 1944 |
| 2,440,249 | Deakin | Apr. 27, 1948 |
| 2,441,269 | Hartig | May 11, 1948 |